July 23, 1963  R. VERBRUGGE  3,098,729
DEVICE FOR SUPPLYING AN AMOUNT OF WATER INTO AN
ACETYLENE-PRODUCING FULMINATING CANNON
Filed April 25, 1960
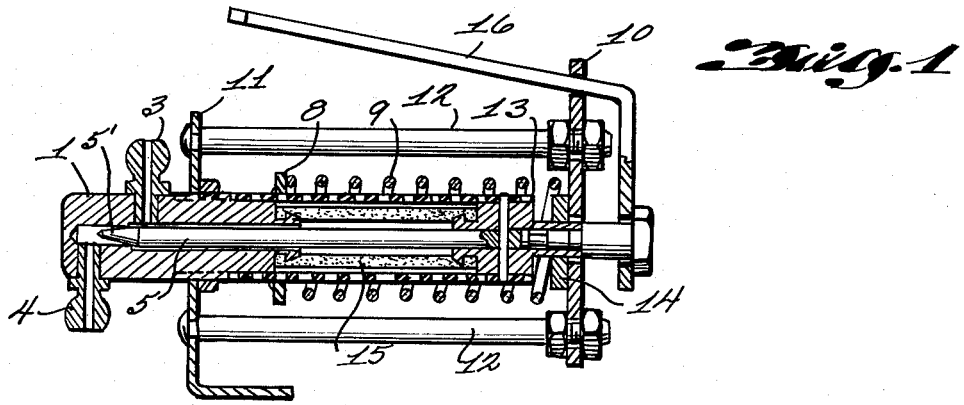
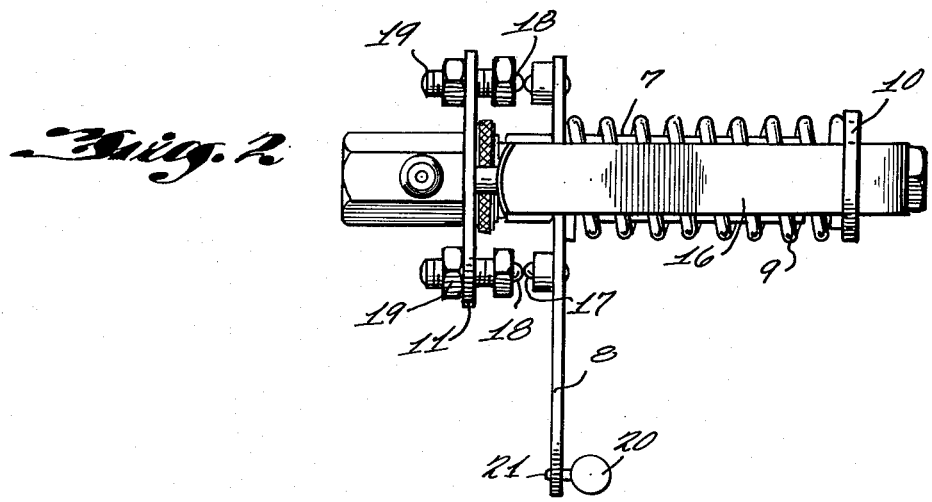
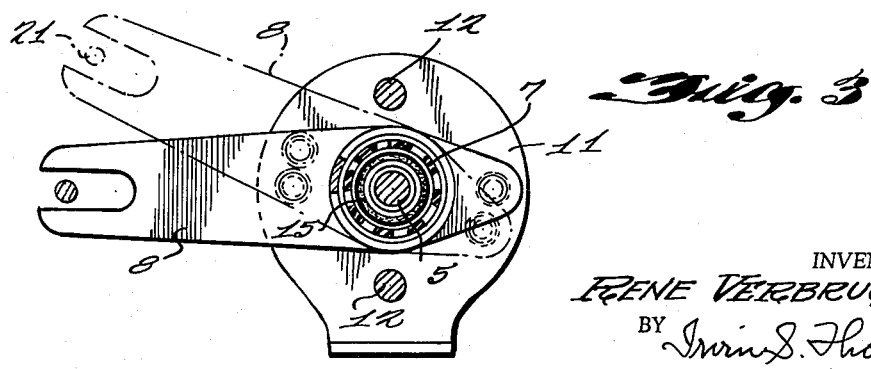
INVENTOR.
RENE VERBRUGGE
BY Irwin S. Thompson
ATTY.

3,098,729
DEVICE FOR SUPPLYING AN AMOUNT OF WATER INTO AN ACETYLENE-PRODUCING FULMINATING CANNON

René Verbrugge, 130 Markegemstraat, Wakken, Belgium
Filed Apr. 25, 1960, Ser. No. 24,287
Claims priority, application Belgium Apr. 29, 1959
6 Claims. (Cl. 48—37)

This invention relates to a device for supplying an amount of water to a cannon into which acetylene is produced by the action of water on calcium carbide and inside which the gases thus produced act, before reaching the cannon proper, upon a diaphragm so as to move thereby a pressure rod which acts on a plurality of synchronized members.

In a fulminating cannon of the type described, according to the requirements, a small amount of water is brought into contact with calcium carbide. In this way, there is produced acetylene which is recovered and led towards a combustion chamber where a spark is produced, in a way known per se, so that the acetylene gas explosion then occurs.

In the fulminating cannons of this kind, problems have been encountered up to now regarding the regularity with which the water is supplied.

The invention has for its object to obviate this drawback and to provide a device which is completely suitable therefor.

For this purpose, said rod also acts on a rocking lever which is provided with at least one cam-like projection which after a determined rotating of the lever, engages a cam-like projection which is fixed with respect to the device in such a way that the lever which is axially movable on a shaft, acts on a valve-needle that controls the water flow.

In an advantageous embodiment, said valve-needle is arranged inside the shaft around which the lever rocks.

Advantageously said rocking lever is integral with a sleeve which is slipped over said shaft and which is connected by a pin to said valve-needle, in such a way that said valve-needle is brought, under the power of a spring, to a position that corresponds to the closing of a small water supply channel.

A detail of the invention lies in that the head of said valve-needle, the purpose of which is to close said small water supply channel, is very sharply pointed.

Other details and features of the invention will stand out from the description given below of a device for supplying an amount of water into an acetylene-producing cannon. This description is only given by way of non limitative example. The reference numerals pertain to the accompanying drawings.

FIGURE 1 is a side view, partially in section, of the device according to the invention.

FIGURE 2 is a plan view of the same device, the rod acting on the device lever also being shown.

FIGURE 3 is a back view of the device, the lever being shown in two different positions.

The device according to these drawings has thus for its object to provide precisely-determined amounts of water and this in such a way that these amounts are supplied at regular intervals. The device, which is part only of a cannon into which acetylene is produced by water reacting with calcium carbide, comprises essentially a shaft 1 provided with a central channel 2, channel into which open a water inlet pipe 3 and a water outlet pipe 4. Inside the central channel 2, that follows the geometrical axis of the shaft 1, is located a valve-needle 5 one end of which is connected by a pin 6 to a sleeve 7. On said sleeve 7 is fixedly attached a lever 8. A spring 9 is also present between the lever 8 and a plate 10, which is part together with plate 11 of the frame inside which is located the shaft 1. The plates 10 and 11 are assembled together by bolts 12. On that side where the sleeve 7 is connected by pin 6 to the valve-needle 5, there is also provided a guiding part 13 through which passes the pin 6. This guiding part is movable lengthwise inside an element 14 which is fixed with respect to plate 10.

As the valve-needle 5 is used as closing member for the water supply, a sealing joint 15 is moreover provided inside sleeve 7 as well as around valve-needle 5. The purpose of lever 16 will be described hereinbelow.

So as to cause such an axial movement of valve-needle 5 that the conical point 5' will free the bore of the central water supply channel 2, a simple device has been designed, the lever 8 being the main part thereof.

On lever 8, which might rock in any plane whatsoever but which according to FIGURE 3 for instance, moves in a vertical plane, are provided cam-like projections 17. Said cam-like projections are actually shaped as half balls. Similar projections 18 are also provided on plate 11. The cam or half ball-like projections 18, which are fixed with respect to the whole device, are arranged on adjusting screws 19 in such a way that the distance thereof to the projections of lever 8 may be adjusted.

Thus, when lever 8 will have been raised by rod 20, by means of a link-pin 21, the sleeve 7 taken along by lever 8 will be so axially moved that the valve-needle 5 will perform a similar movement, in such a way that the conical point 5' of the valve-needle will free the water supply pipe or central channel 2. At the same time, the water will flow from the supply pipe 3 towards the outlet pipe 4.

As it will be noticed, the axial movement of sleeve 7, due to the displacement of lever 8 itself, results from the action of projections 17 and 18 which have during raising of lever 8 an action similar to the one of ordinary cams. The displacement amplitude depends from the adjustment of the play of screws 19.

As long as the sharp-pointed end 5' of the valve-needle 5 is retained back, the water flows from the water tank towards the carbide tank and acetylene gas is produced in an amount proportional with the supplied water amount.

When starting the device, the valve-needle 5 may simply be pulled back by pushing-in the lever 16, which has already been mentioned. The action of lever 16 on the device as a whole is shown clearly in FIGURE 1.

It must be understood that the invention is in no way limited to the above embodiment and that within the scope of this invention many changes may be brought therein.

I claim:

1. Apparatus for controlling the amount of water supplied to a cannon in which acetylene is produced by the action of water on calcium carbide and which is provided with a rod actuated by said cannon which acts on a plurality of synchronized members comprising a lever rockingly mounted on a shaft and axially movable relative thereto, means connecting the lever to said rod, cam means interposed between said lever and a fixed portion of the apparatus and cooperating to transform rocking movement of the lever into axial movement, and a water-controlling needle valve having a needle positioned in an axial bore within the shaft about which the lever rocks and is axially movable when actuated by axial movement of the lever.

2. Apparatus according to claim 1 in which the lever is fixed to a sleeve mounted on the shaft for rotary and axial movement, means is provided connecting the sleeve to the valve needle, and a spring is provided urging the needle to a position to stop the flow of water.

3. Apparatus according to claim 2 in which the head of the needle is sharply pointed and cooperates with a small water-supply channel.

4. Apparatus according to claim 1 in which the cam means is adjustable to vary the axial movement of the lever for a given rocking movement.

5. Apparatus according to claim 1 in which a second lever is provided to axially move the needle of the valve independently of the operation of the rocking and axially movable lever.

6. Apparatus for controlling the amount of water supplied to a cannon having therein calcium carbide so as to produce acetylene by the action of the water on the calcium carbide comprising frame means, a shaft having disposed therein a channel through which water to be supplied to said cannon passes, needle-valve means disposed in said channel to control passage of the water therethrough, means engaging said needle-valve means to maintain same in a position to prevent the passage of water through said channel, a sleeve member mounted on said shaft for rotary and axial movement, said needle-valve means connected to said sleeve, lever means fixed to said sleeve member to rotate same, means operatively connected between said cannon and said lever means to impart rotary movement thereto upon actuation of said cannon, and cam means disposed between said frame and said lever means to impart axial movement to said needle-valve means upon rotary movement of said lever means thereby allowing water to pass through said channel.

References Cited in the file of this patent

UNITED STATES PATENTS

| | | |
|---|---|---|
| 929,296 | Fenton | July 27, 1909 |
| 1,060,671 | Davis | May 6, 1913 |
| 1,811,601 | Winton | June 23, 1931 |
| 2,506,837 | Kochner | May 9, 1950 |